United States Patent
Steinbrenner et al.

(10) Patent No.: US 6,754,310 B1
(45) Date of Patent: Jun. 22, 2004

(54) TELEPHONY INTERFACE DEVICE FOR PROVIDING DIAGNOSTIC INFORMATION TO A TELEPHONE

(75) Inventors: Kurt W. Steinbrenner, Bartlett, IL (US); George D. Rojas, Arlington Heights, IL (US); Arvind P. Rao, Rolling Meadows, IL (US)

(73) Assignee: 3Com Corporation, Rolling Meadows, IL (US)

( * ) Notice: Subject to any disclaimer, the term of this patent is extended or adjusted under 35 U.S.C. 154(b) by 0 days.

(21) Appl. No.: 09/801,953

(22) Filed: Mar. 8, 2001

(51) Int. Cl.[7] .............................................. H04M 1/24
(52) U.S. Cl. .............................. 379/29.01; 379/26.02; 379/27.01
(58) Field of Search ................................ 379/21, 26.02, 379/27.01, 27.02, 27.03, 27.04, 29.01, 26.01, 29.08, 29.11

(56) References Cited

U.S. PATENT DOCUMENTS

| | | | | |
|---|---|---|---|---|
| 5,343,461 A | * | 8/1994 | Barton et al. | 370/249 |
| 5,818,906 A | * | 10/1998 | Grau et al. | 379/32.04 |
| 5,857,011 A | * | 1/1999 | Kennedy et al. | |
| 5,922,047 A | * | 7/1999 | Newlin et al. | 709/217 |
| 5,933,475 A | * | 8/1999 | Coleman | 379/10.01 |
| 5,946,374 A | * | 8/1999 | Bower | 348/192 |
| 6,145,101 A | * | 11/2000 | Pike | 714/46 |
| 6,163,270 A | * | 12/2000 | Silverman | 340/3.3 |
| 6,163,594 A | * | 12/2000 | Kennedy et al. | |
| 6,167,443 A | * | 12/2000 | Decker et al. | 709/219 |
| 6,192,109 B1 | * | 2/2001 | Amrany et al. | 379/30 |
| 6,282,239 B1 | * | 8/2001 | Thompson | 375/224 |
| 6,314,086 B1 | * | 11/2001 | Katz et al. | |

* cited by examiner

*Primary Examiner*—Binh Tieu
*Assistant Examiner*—Barry W Taylor
(74) *Attorney, Agent, or Firm*—Baniak Pine & Gannon

(57) ABSTRACT

An apparatus for providing diagnostic information to at least one telephone includes a telephony interface device operatively coupled to at least one telephone through a telephone line. The telephony interface device is operatively coupled to a network. The telephony interface device transmits diagnostic information to the at least one telephone. The diagnostic information may include, for example, diagnostic information concerning the network, the telephony interface device itself, and the telephone line.

31 Claims, 10 Drawing Sheets

System State Diagram

System State Diagram
Figure 1

Telephony Interface Device
Figure 2

TELEPHONY INTERFACE DEVICE FOR PROVIDING DIAGNOSTIC INFORMATION TO A TELEPHONE

FIELD OF THE INVENTION

This invention relates generally to the field of telecommunications and, in particular, to a telephony interface device for providing status and diagnostic information to a telephone operatively coupled to the telephony interface device.

BACKGROUND OF THE INVENTION

Since the invention of the telephone by Alexander Graham Bell over 100 years ago, various systems have been implemented to allow a homeowner, for example, to transmit and receive information. The communication service that most people have used on a daily basis typically includes copper wires that are routed from a Local Exchange Carrier (your local telephone company) to a small gray box mounted on the side of the home (commonly referred to as a Network Interface Device). This small gray box connects the copper wires of the "local loop" to the telephone wiring inside the home and the RJ-11 (telephone jacks) connection points also within the home. The traditional Network Interface Device that has been used for many years typically has no digital components or microprocessor-based intelligence. It is simply an electronic circuit that detects current and voltage changes that are a result of the switching activity (i.e., open circuit, closed circuit) at either end of the copper wires. Voice is carried as an analog signal over the copper wires and is electrically coupled to a common telephone on one end, and Local Exchange switching equipment at the other.

There are many disadvantages to this conventional arrangement. For example, problems arise when attempting to diagnose various failures that may occur with these conventional Network Interface Devices. Typically, these conventional Network Interface Devices may include a plurality of LED's that are intended to allow customers and/or field technicians to diagnose system and/or network element status. However, the LEDs are not very useful to customers and/or field technicians in diagnosing system or network element status. In particular, the use of LEDs requires the oftentimes non-intuitive interpretation of LED light combinations to determine the operational status of the system. Moreover, an extra terminal port interface (i.e., a dumb terminal) may be used to provide field technicians with a means to diagnose system or network element status. However, diagnostic terminal port interfaces typically required a high level of familiarity from a trained technician. Moreover, diagnostic terminal port interfaces and LEDs typically provide no information to the end-user when the Network Interface Device is mounted outside of the house. Finally, remote terminal diagnostics have been used in the past by a network operator, but only if network conductivity is available or is intact. As a result, remote terminal diagnostics may not be available when network conductivity problems arise.

Within the last decade or so, advances in communication technology have enabled the use of alternate media as a replacement for the copper wires in the "local loop." Today, one of these alternate access technologies utilizes the widely deployed Hybrid Fiber Coaxial (HFC) systems that have traditionally carried only Cable Television transmissions to residential areas. Many of these HFC systems have recently been enhanced to provide multimedia services (video, voice, and high-speed data) by incorporating advanced communication technologies in equipment that is connected to the HFC cable. HFC cable networks are typically organized such that there are aggregation points where the physical cable is fanned out into a number of residential areas. These aggregation points are known as "head ends." Media content is formatted and combined by computer-based communication equipment at these "head ends" for delivery to customers along the HFC distribution network, which spans the residential areas that are served. Network routing and bridging equipment is also provided at these "head ends," which provide bi-directional interconnection between the access network (which provides residential access for users) and the Service Provider Network (which provides access to the existing Public Switched Telephone Network (PSTN) and the public Internet). At each residence of a paying subscriber, a similar computer-based communication device (hereafter referred to as a Residential Gateway) must be connected to the HFC cable. The Residential Gateway decodes the media content and delivers the transmissions to residential devices in the home (television sets, etc.). In the past, since HFC networks generally carried only video media content, these Residential Gateways were better known as "set-top boxes" or "cable boxes." Today, these HFC communication devices can handle more than video media content. As a result, the Residential Gateway device has been enhanced to provide interfaces to multiple networks in the home including, for example, cable TV wiring and telephone wiring.

Traditional telephony voice services have evolved to provide many enhanced features above and beyond the basic two-party phone call. These services have traditionally been implemented in the switching equipment of the service provider or in adjunct devices that reside at the Local Exchange Office. Users are able to enable and configure some of these features through configuration "menus" that prompt the user through the playout of tones or voice messages delivered by the Local Exchange Equipment. User input is then accepted, which is typically in the form of Dual Tone Multi-Frequency (DTMF) digits generated by the user handset or spoken words received by the handset. However, as set forth above, there is at least one major drawback to these conventional services. In particular, the enablement and configuration of these features (and the service, in general) depends upon on the integrity of the connection between the Local Exchange Equipment and the Network Interface Unit (at the user's home), which bridges the user's home phone wiring. For example, in existing telephony systems, aural diagnostics and status information (in the form of voice prompts) are played and controlled from a Class 5 switch, and therefore depend upon the access network being intact (assuming the technician is at someone's home).

Conventional Residential Gateway devices such as, for example, the Aplio/Phone device allows users to make telephone calls via the internet. The device acts as a gateway between the user's phone network in the home and an access network (ISP dialup, or Ethernet connection to a broadband interface device i.e., Cable Modem, DSL modem, etc.) that provides a connection to the public internet. The Aplio/Phone is a simplistic device that does not require the use of a computer for setting up configuration parameters or for making or receiving phone calls. It provides a configuration function that uses the telephone handset and it's DTMF keypad as the configuration user interface. Pre-recorded voice messages are played to prompt the user for DTMF input for various functions, and to provide confirmation of user entry. For example, the DTMF keypad may be used as a DTMF input to, for example, configure the mode of the device, select language, select ISP preferences, enable and disable features, initiate software upgrades, enter numbers, logins, passwords, etc. However, these voice prompts are only used to configure the unit for initial use and do not provide any status or diagnostic information once configuration is complete.

Voice prompts have been used in certain navigation systems to inform the operator of the status of various systems and relay various instructions via pre-recorded voice messages. For example, in certain automobile applications, voice prompts such as "your door is ajar" or "check engine" have been used to relay information to the driver. Similarly, in certain aircraft applications, voice prompts such as "Pull up! Pull up!" have been used in ground proximity warning applications to warn pilots when encountering dangerously low altitudes. However, these systems are closed systems (i.e., the voice prompts are activated only by certain predetermined events). For example, they are not interactive systems that can accept user input through a POTS phone for retrieving and configuring diagnostic information and settings.

Accordingly, it would be desirable to have a simple and cost effective telephony interface device that overcomes the disadvantages described above, and provides diagnostic information directly to a telephone that is operatively coupled to the telephony interface device.

SUMMARY OF THE INVENTION

One aspect of the invention provides a system for providing diagnostic information to at least one telephone including a telephony interface device operatively coupled to at least one telephone through a telephone line. The telephony interface device is operatively coupled to a network, wherein the telephony interface device transmits diagnostic information to the at least one telephone. The diagnostic information may preferably include diagnostic information concerning the network, the telephony interface device, and the telephone line. The diagnostic information may preferably be transmitted to the at least one telephone through voice prompts. The diagnostic information may preferably be requested through the at least one telephone by a user of the at least one telephone. The at least one telephone may preferably be a Dual Tone Multi-Frequency keypad, and the diagnostic information may preferably be requested through the Dual Tone Multi-Frequency keypad. The transmission of diagnostic information may preferably be an interactive exchange between the telephony interface device and a user of the at least one telephone. The interactive exchange may preferably be carried out at least in part through voice prompts or through the Dual Tone Multi-Frequency keypad.

The network may preferably be a service provider network. An access network may also be provided, the access network operatively coupled between the service provider network and the telephony interface device. A network router may also be provided. The network router may preferably be operatively coupled between the access network and the service provider network. The telephony interface device may preferably be include an access network interface operatively coupled to the network to allow the telephony interface device to be in communication with the network. The telephony interface device may also include a host processor for controlling and routing data between the access network interface and the at least one telephone. The telephony interface device may also include a memory device, the host processor and the memory device each operatively coupled to the access network interface. The telephony interface may also include a signal processor for transmitting diagnostic information to the at least one telephone. The signal processor may preferably be operatively coupled to the access network interface, the host processor, and the memory device. The signal processor may preferably be a digital signal processor. The telephony interface device may also preferably include a telephone interface operatively coupled to the signal processor and to the at least one telephone to allow the telephony interface device to be in communication with the at least one telephone.

Another aspect of the invention provides a telephony interface device for providing diagnostic information to at least one telephone operatively coupled to the telephony interface device. The telephony interface device includes an access network interface to allow the telephony interface device to be in communication with a network. The access network interface is operatively coupled to a host processor for controlling and routing data between the access network interface and the at least one telephone. The access network interface is also coupled to a memory device. A signal processor is operatively coupled to the access network interface, the host processor and the memory device. The signal processor is also operatively coupled to a telephone interface wherein the signal processor is configured to transmit the diagnostic information from the telephony interface device to the at least one telephone. The diagnostic information may preferably include diagnostic information concerning the network and the telephony interface device.

Another aspect of the invention provides a method of providing diagnostic information to at least one telephone. A telephony interface device operatively coupled to the at least one telephone through a telephone line is provided. The telephony interface device is operatively coupled to a network. Diagnostic information is transmitted from the telephony interface device to the at least one telephone. The diagnostic information may preferably include diagnostic information concerning the network and the telephony interface device. The diagnostic information may preferably be transmitted to the at least one telephone through voice prompts. The diagnostic information may preferably be requested through the at least one telephone by a user of the at least one telephone. The at least one telephone may preferably include a Dual Tone Multi-Frequency keypad, and the diagnostic information may preferably be requested through the Dual Tone Multi-Frequency keypad. The transmission of diagnostic information may preferably include an interactive exchange between the telephony interface device and a user of the at least one telephone. The interactive exchange may preferably be carried out at least in part through voice prompts or through the Dual Tone Multi-Frequency keypad.

The network may preferably be comprised of a service provider network. An access network may preferably be provided. The access network may preferably be operatively coupled between the service provider network and the telephony interface device. A network router may also be provided. The network router may preferably be operatively coupled between the access network and the service provider network. The telephony interface device may preferably include an access network interface operatively coupled to the network to allow the telephony interface device to be in communication with the network. The telephony interface device may preferably include a host processor for controlling and routing data between the access network interface and the at least one telephone. The telephony interface device may preferably include a memory device. The host processor and the memory device each may preferably be operatively coupled to the access network interface. The telephony interface may also include a signal processor for transmitting diagnostic information to the at least one telephone. The signal processor may preferably be operatively coupled to the access network interface, the host processor, and the memory device. The telephony interface device may preferably include a telephone interface operatively coupled to the signal processor and to the at least one telephone to allow the telephony interface to be in communication with the at least one telephone.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

DETAILED DESCRIPTION OF THE PRESENTLY PREFERRED EMBODIMENTS

Figure 1:
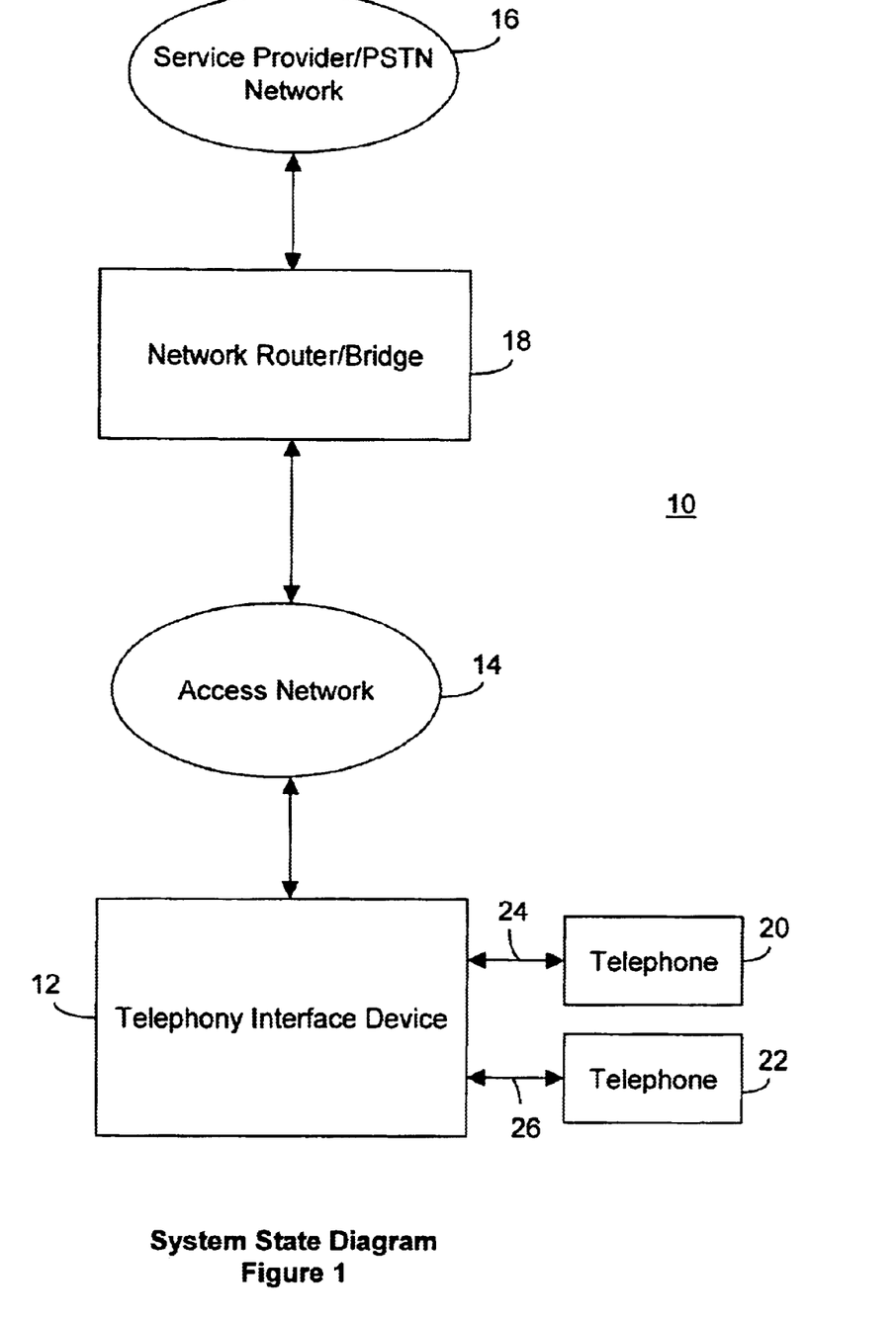
FIG. 1 is a block diagram of a preferred embodiment of a telephony interface device made in accordance with the invention wherein the telephony interface device is shown in a communication system.

A communication system 10 is shown in FIG. 1, which includes a telephony interface device 12 that is shown directly interfaced with an access network 14. In the embodiment shown, the access network 14 is linked to a service provider network (PSTN network) 16 via the network router/bridge 18. The access network 14 may preferably be, for example, a hybrid fiber/coaxial network.

The telephony interface device 12 is a device that is used to provide telephony services to a home. The telephony interface device 12 provides an electrical interface to the home telephone wiring. Moreover, the telephony interface device 12 transforms the signal that carries the voice and electrical switching signals between the access network 14 and the home telephone wiring.

Referring to FIG. 1, the telephony interface device 12 provides a gateway function for voice and signaling information between Plain Old Telephone Service (POTS) analog phone interfaces 20, 22 and the access network 14. The telephony interface device 12 monitors the state of the system 10 (via its access network interface 30 (see FIG. 2)), the state of its own internal hardware and software, as well as the state of the POTS telephony lines 24, 26 that connect the POTS phone interfaces 20, 22 to the telephony interface device 12. The telephony interface device 12 therefore detects and provides status and diagnostic information to the user through the primary interface that is used (i.e., the POTS phone). The term diagnostic information as used herein is meant to include, for example, both diagnostic information and status information.

The telephony interface device 12 is configured to be able to locally generate and control (i.e., via stored program decision logic) voice prompts for providing status or troubleshooting information about the access network 14, the service provider network 16 (and associated equipment), the telephony interface device 12 itself, and any peripheral devices such as connected telephones 20, 22, answering machines, etc. Connection or association with the rest of the access network 14 or service provider network 16 is not required for the delivery of this status information.

Referring again to FIG. 2, the access network 14 may preferably include the physical media and any supporting transport components (amplifiers, signal converters, etc.) which connect the telephony interface device 12 to the service provider network 16 via the network router/bridge 18. All signaling and voice information that is either sent or received from the telephony interface device 12 traverses the access network 14. The network/router bridge 18 provides routing of information (signaling and voice) between the service provider network 16 and the access network 14. Finally, the service provider network (PSTN network) 16 may preferably include the physical media and all the equipment (switches, servers, database systems, etc.) that are utilized in authenticating, authorizing, billing, and setting up telephone connections and calls initiated by (or terminated to) the POTS phones 20, 22.

Figure 2:
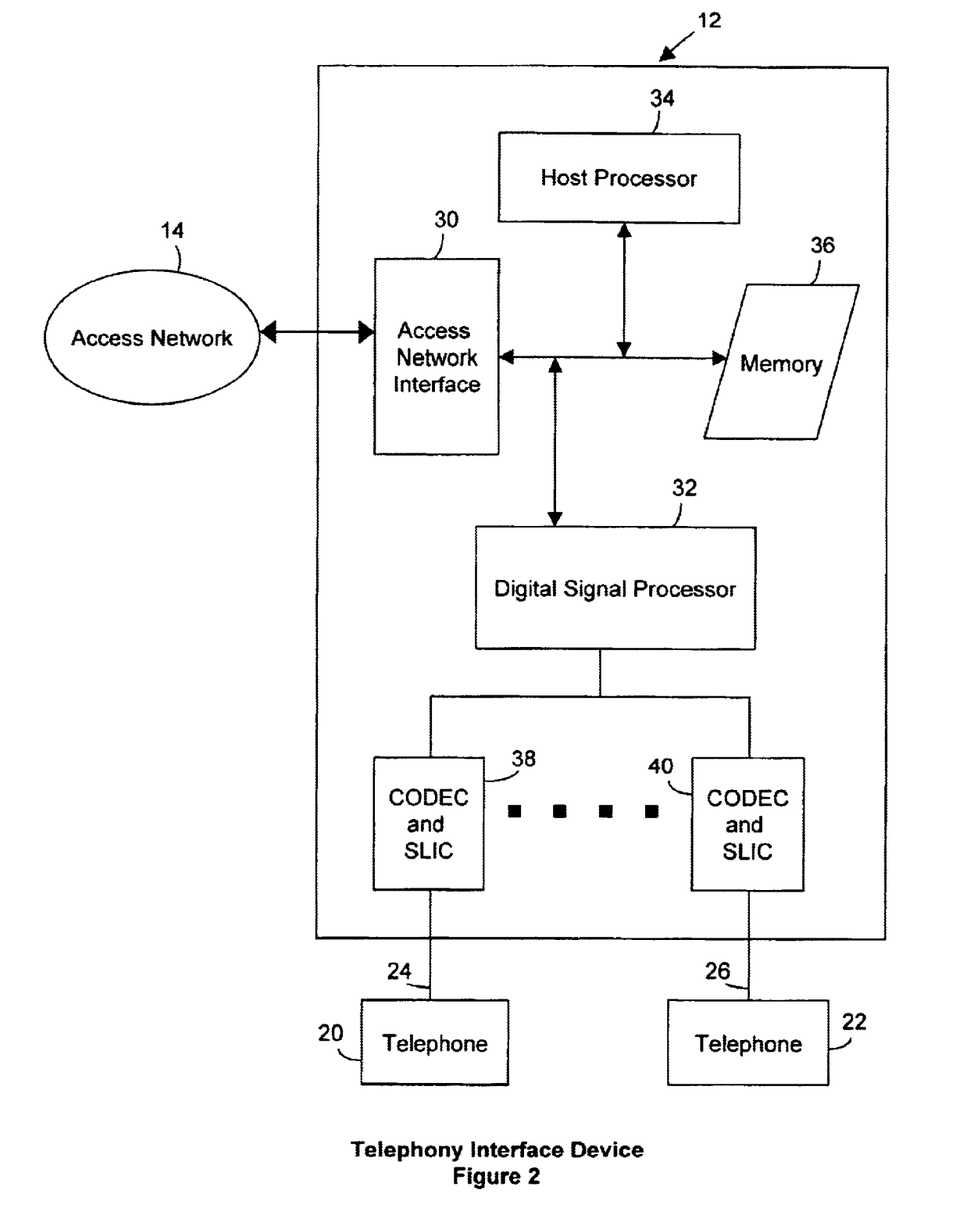
FIG. 2 is a block diagram of the telephony interface device of FIG. 1 wherein the telephony interface device is shown coupled to an access network.

FIG. 2 is a block diagram that illustrates a preferred embodiment of the telephony interface device 12. As shown in FIG. 2, the telephony interface device 12 includes an access network interface 30 (that is shown directly interfaced to the access network 14, a digital signal processor 32, a host processor 34, a memory device 36, and CODEC and SLICs 38, 40 that interface to the POTS phones 20, 22.

The access network interface 30 provides the hardware interface, control, and logic to translate voice and signaling information to the appropriate format for transmission to and from the access network 14. The host processor 34 contains a stored program in the memory device 36. The stored program carries out a routine to control and pass data between the access network interface 30 and the digital signal processor 32. The stored program also provides a means for communicating with network elements in the access network 14 and the service provider network 16 for establishing network connectivity, monitoring POTS line and system status, and for setting up and tearing down connections used for voice calls via the connected POTS phones 20, 22.

The digital signal processor 32 contains a stored program in memory 36 which carries out a routine for providing voice sampling and/or playout, DTMF tone detection and/or generation, signaling detection and/or generation, echo cancellation, voice compression and/or decompression, etc. The processor 32 may be any of the commercially available processors such as, for example, a TMS 320C52 manufactured by Texas Instruments Inc.

The memory 36 provides for the storage of the stored program and all necessary variable information for the microprocessor 34 and digital signal processor 32 components. The memory 36 also provides storage for state and status information for the system 10, the telephony interface device 12, and each POTS line 24, 26. The memory 36 may preferably be any of the commercially available memory devices such as, for example, an EEPROM (Electrically Erasable Programmable Read Only Memory), a SRAM (Static Random Access Memory) or Flash Memory suitable for storing state and status information for the system. The CODEC/SLICs 38, 40 provide the hardware interface and the coding/decoding (i.e., analog to digital and digital to analog) functions necessary to generate and/or receive signaling and voice information between the digital signal processor 32 and the connected POTS phones 20, 22. In particular, the CODEC may preferably include the coding and decoding (i.e. analog to digital and digital to analog converter) functions. The SLIC may preferably be any conventional subscriber line interface circuit.

Figure 3:
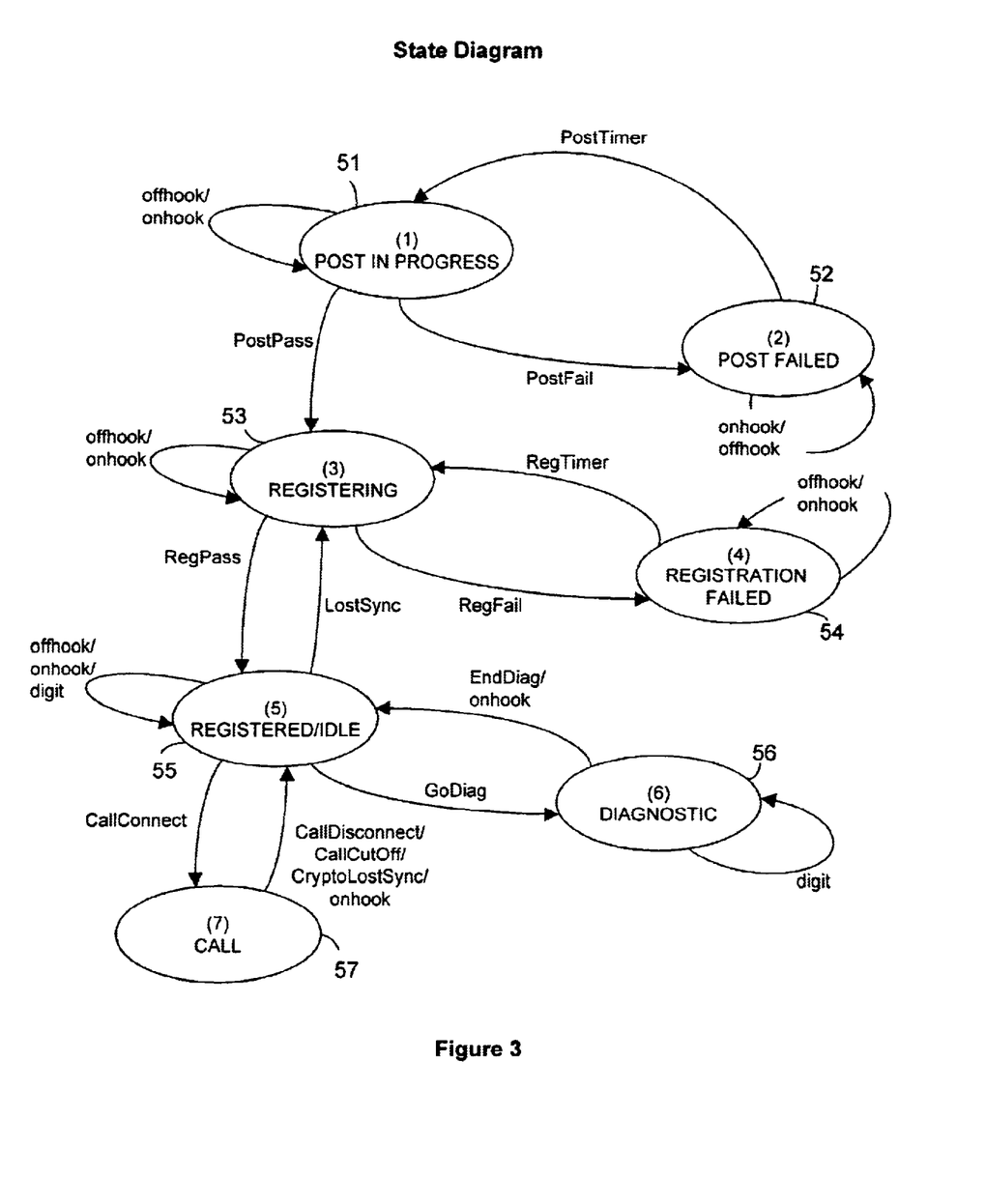
FIG. 3 is a state diagram illustrating the various states of the telephony interface device.

FIG. 3 is state diagram illustrating the various operating states of the telephony interface device 12. A total of seven operating states are shown, including a Power-On-Self-Test (POST) In Progress state 51, a POST Failed state 52, a Registering state 53, a Registration Failed state 54, a Registered/Idle State 55, a Diagnostic state 56, and a Call state 57. Each of these states will be described in more detail below.

Figure 4:
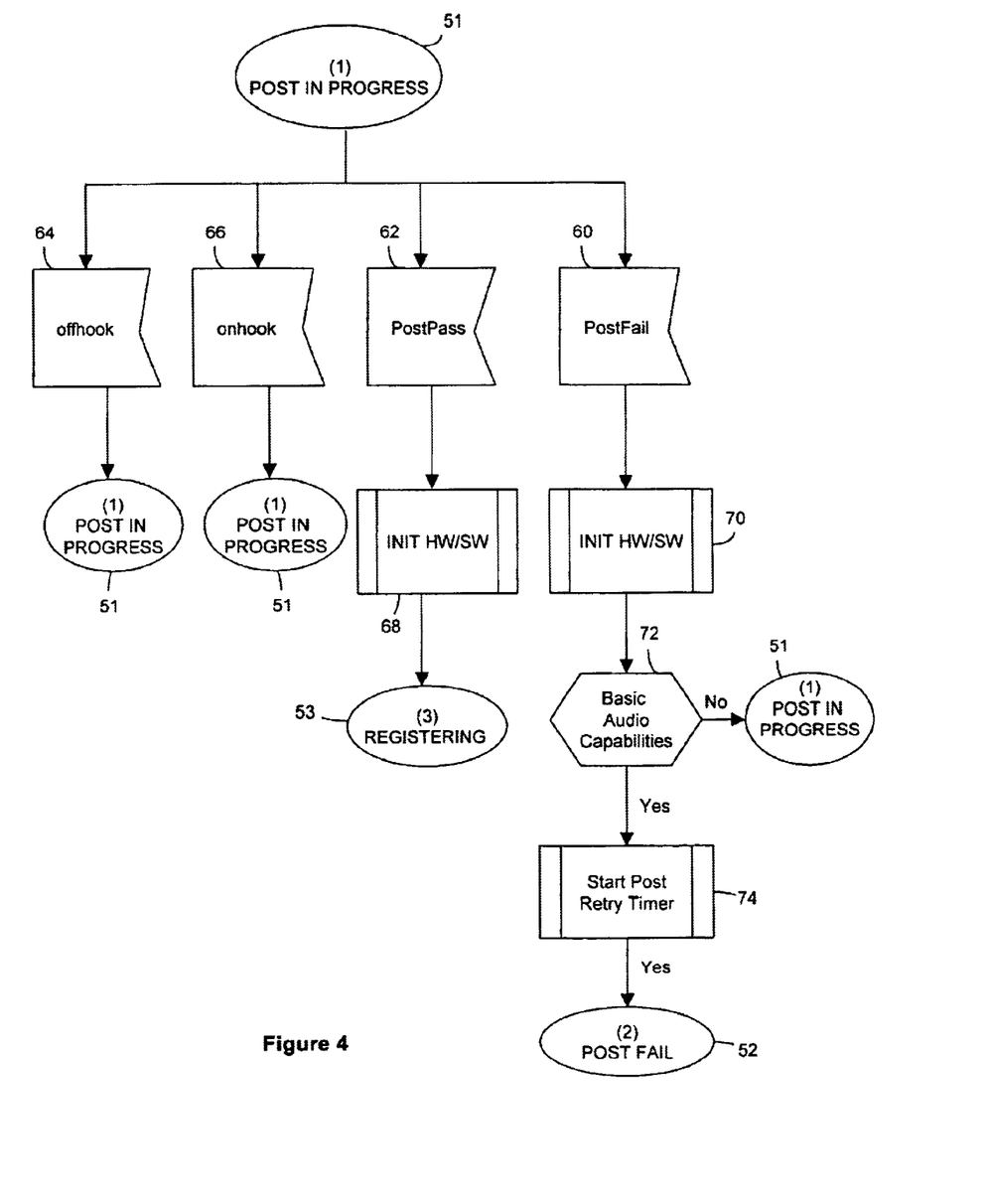
FIG. 4 is a flow chart illustrating the Power-On-Self-Test (POST) In Progress state shown in FIG. 3.

FIG. 4 is flow chart illustrating the operation of the telephony interface device 12 in the POST In Progress state 51. The POST In Progress state 51 is the initial state that the telephony interface device 12 enters when it is first powered on. While in this state, a stored program in memory 36 begins initializing and testing the hardware of the telephony interface device 12 (i.e., the access network interface 30, the host processor 34, the digital signal processor 32, the memory 36, and the CODEC/SLIC interface 38, 40). The stored program also initializes the main software components to run on the host processor 34 and the digital signal processor 32. If any of these tests or initializations fail, an internal event indicating PostFail is generated (see 60). If all of these tests and initializations succeed, an internal event indicating PostPass 62 is generated (see 62).

When the user picks up a phone connected to the telephony interface device 12 and the hardware detects this event, an offhook event is generated (see 64). While in this state, most of the software and hardware is not fully initialized. Therefore an offhook transition is ignored and the telephony interface device 12 remains in the POST In Progress state 51. When the user hangs up a phone connected to the telephony interface device 12 and the hardware detects this event, an onhook event is generated (see 66). While in this state, most of the software and hardware is not fully initialized. Therefore an onhook transition is ignored and the telephony interface device 12 remains in the POST In Progress state 51.

If the PostPass event 62 is received in this initial state (i.e., POST In Progress state 51), all hardware devices, interfaces, and software are initialized 68 for full operation. The telephony interface device 12 then transitions to the registering state 53. If the PostFail event 60 is received in this state, an attempt is made to initialize a minimal set of hardware and software components (see 70) to be able to deliver voice-based diagnostic information through a connected telephone handset. If this initialization for basic audio capability is successful 72, a timer is started (i.e. a PostRetryTimer) 74, and the telephony interface device 12 transitions to the POST Fail state. If this initialization for basic audio capability is not successful 72, the telephony interface device 12 remains in the POST In Progress state 51 and attempts to re-run the power-on-self-test sequence.

Figure 5:
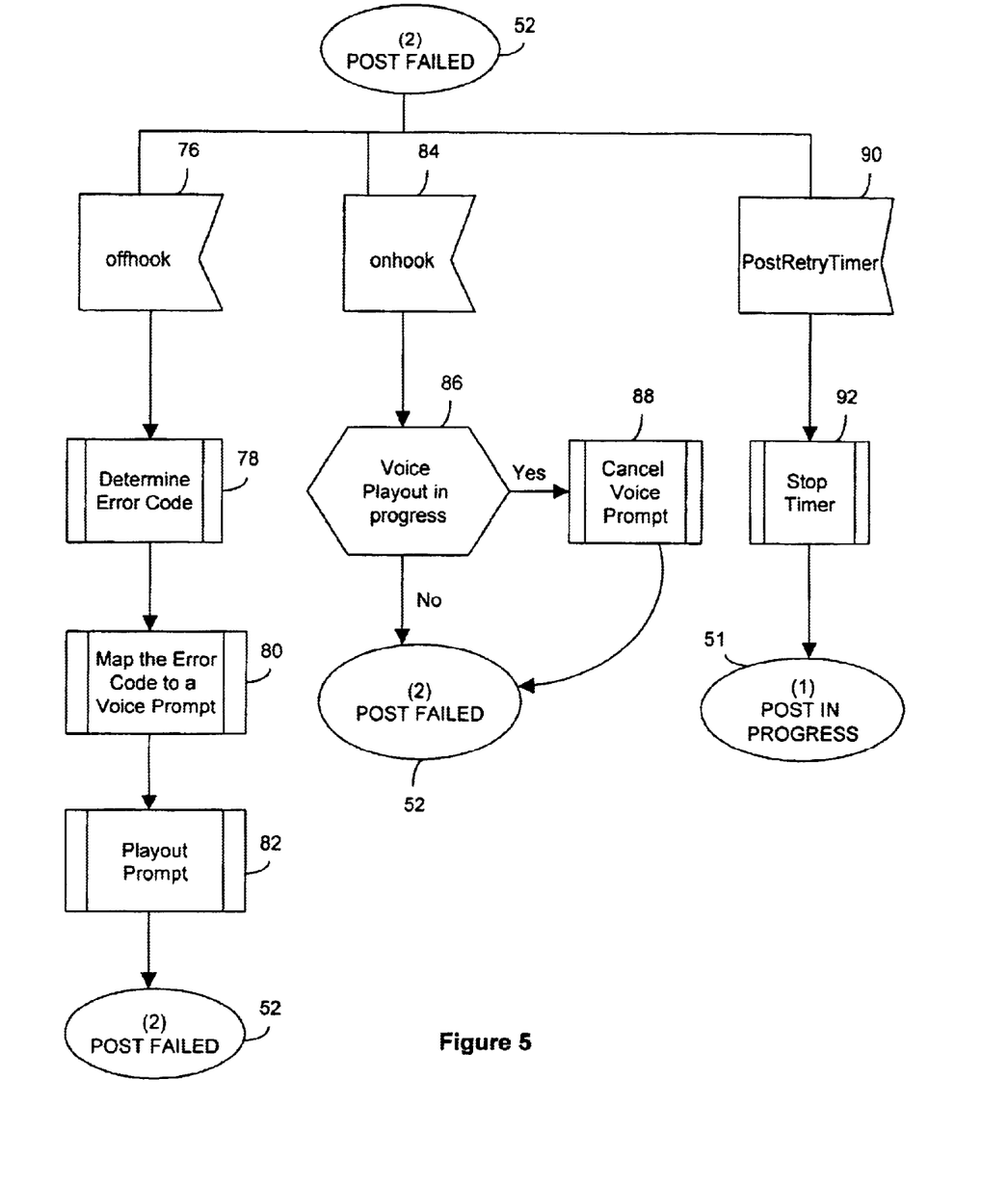
FIG. 5 is a flow chart illustrating the Power-On-Self-Test (POST) Failed state shown in FIG. 3.

FIG. 5 is flow chart illustrating the operation of the telephony interface device 12 in the POST Failed state 52. In this state, the POST sequence has discovered a problem with the initialization of the hardware and/or software. A minimum set of hardware and software capabilities has been initialized to be able to provide voice-based diagnostic information through a connected telephone handset.

If the user picks up a phone connected to the telephony interface device 12 and the hardware detects this event, an offhook event is generated (see 76). While in this state, the POST error code is retrieved and is used to select a digitized voice message from memory (see 78 and 80). The voice message is then played on the telephone line interface on which the offhook event was detected (see 82).

If the user hangs up a phone connected to the telephony interface device 12 and the hardware detects this event, an onhook event is generated (see 84). If any voice message playout is in progress (see 86), the process is cancelled (see 88), and the telephony interface device 12 remains in the POST Failed state 52. If the PostRetryTimer event (see 90) is received in this state, the telephony interface device 12 transitions to the POST In Progress state 51 in an attempt to re-run the Power-On-Self-Tests.

Figure 6:
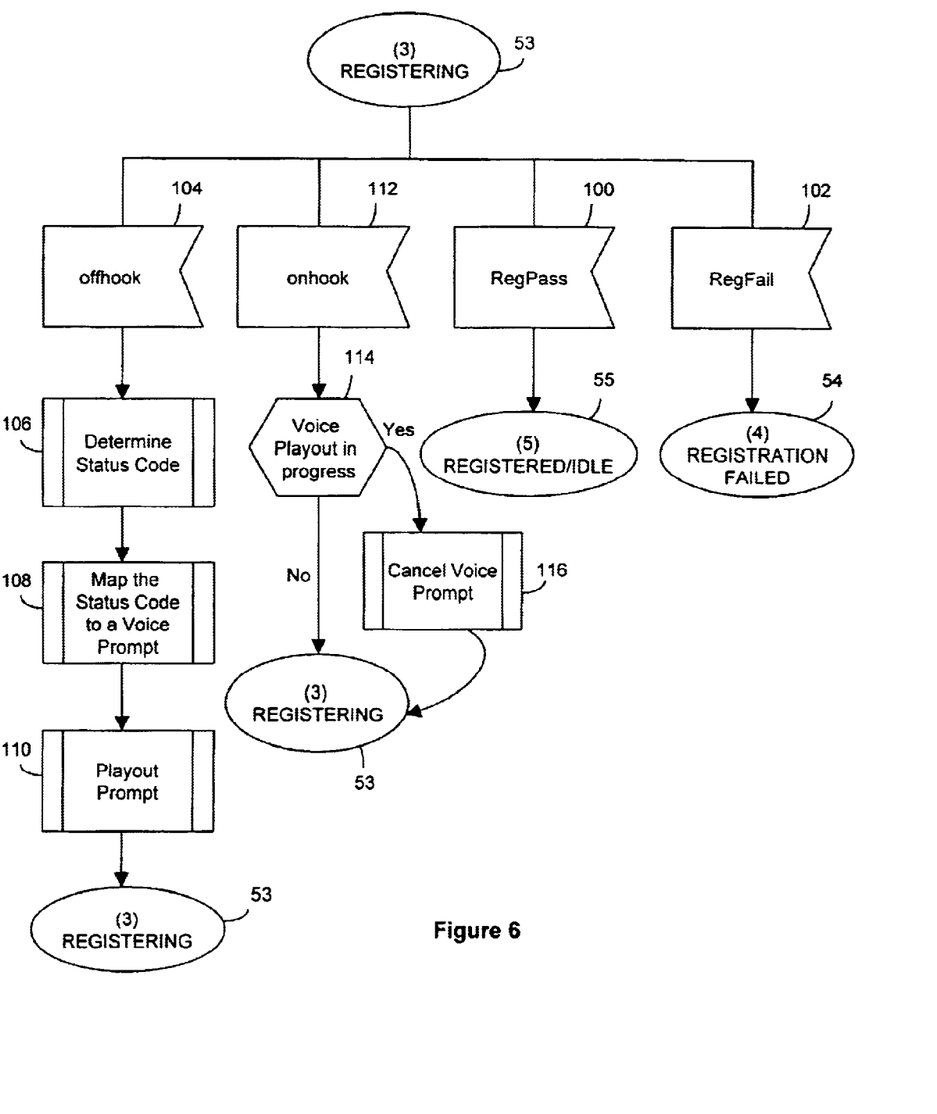
FIG. 6 is a flow chart illustrating the Registering state shown in FIG. 3.

FIG. 6 is flow chart illustrating the operation of the telephony interface device 12 in the Registering state 53. In this state, the telephony interface device 12 will attempt to communicate and synchronize (i.e. register) with the network router/bridge 18 through the access network 14 (see FIG.1). If the telephony interface device 12 is successful in registering with the network router/bridge, a RegPass event is generated (see 100) and the telephony interface device 12 will transition to the Registered/Idle state 55. If the telephony interface device 12 is not successful in registering with the network router/bridge 18, then it will generate a RegFail event (see 102) and transition to the Registration Failed state 54.

If the user picks up a phone connected to the telephony interface device 12 and the hardware detects this event, an offhook event is generated (see 104). While in this state, the telephony interface device 12 is trying to register with the network router/bridge 18 (see 106, 108, 110). Therefore, an offhook transition is ignored and the telephony interface device 12 remains in the Registering state 53.

When the user hangs up a phone connected to the telephony interface device 12 and the hardware detects this event, an onhook event is generated (see 112). While in this state, the telephony interface device 12 is trying to register with the network router/bridge 18. Therefore an onhook transition is ignored and the telephony interface device 12 remains in the Registering state 53. Also, when an onhook event is generated 112, and a voice playout 114 is not in progress, the telephony interface device 12 remains in the Registering state 53. If the voice playout 114 is in progress, then the voice is prompt is cancelled 116, and the telephony interface device 12 remains in the Registering state 53.

If a RegPass event 100 is received in this state, the telephony interface device 12 has successfully registered with the network router/bridge 18, and the telephony interface device 12 transitions to the Registered/Idle state 55. If a RegFail event 102 is received in this state, the telephony interface device 12 was unsuccessful in registering with the network router/bridge 18, a timer is started (RegRetryTimer), and the telephony interface device 12 transitions to the Registration Failed state 54.

Figure 7:
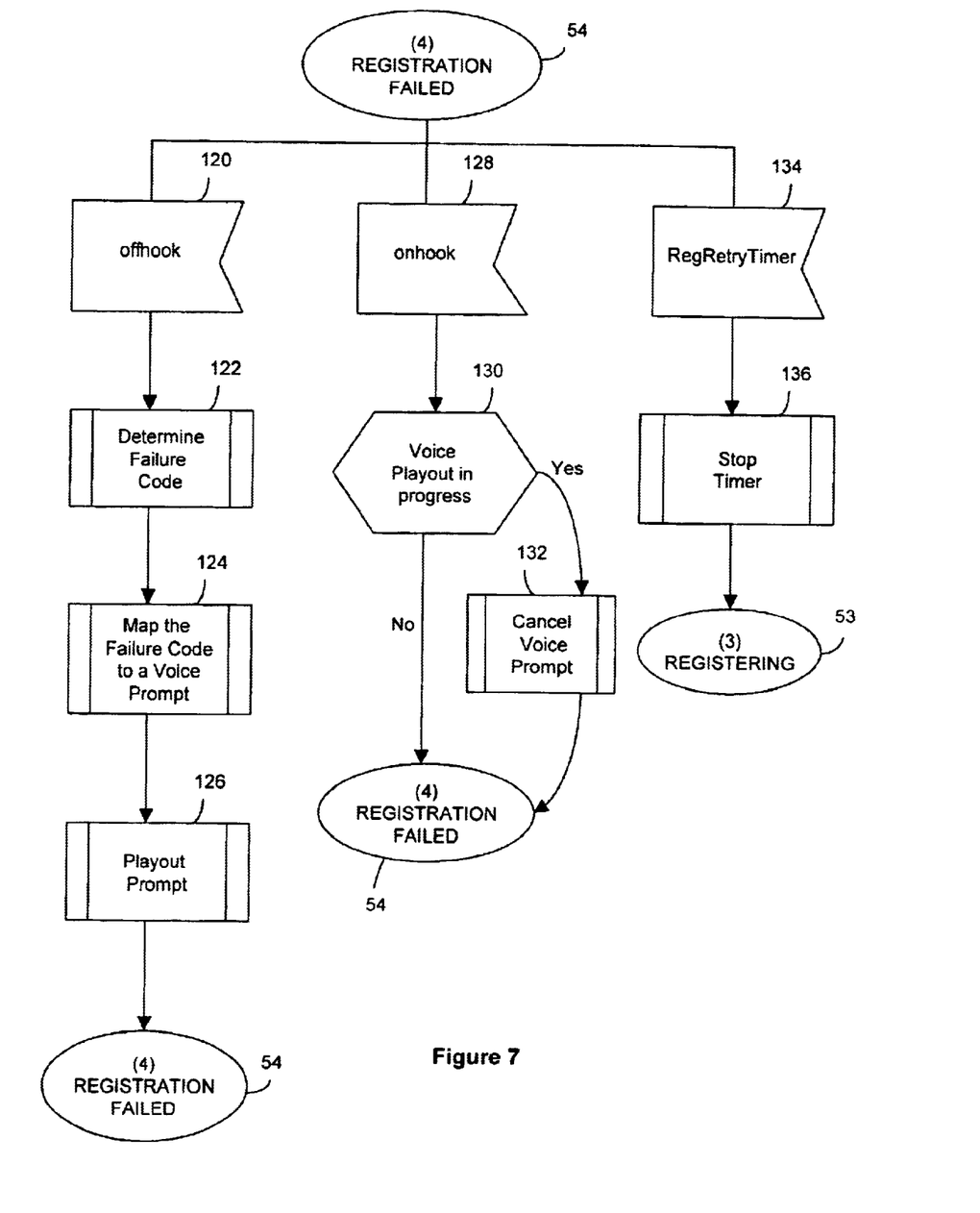
FIG. 7 is a flow chart illustrating the Registration Failed state shown in FIG. 3.

FIG. 7 is flow chart illustrating the operation of the telephony interface device 12 in the Registering Failed 54 state. The telephony interface device 12 enters this state if there is a failure during the registration process. If the user goes off hook, the telephony interface device 12 will play a voice prompt to the user that he has failed to register with the access network 14. In particular, if a user picks up a phone connected to the telephony interface device 12 and the hardware detects this event, an offhook event is generated (see 120). While in this state, the registration failure code is retrieved (see 120) and is used to select a digitized voice message from memory (see 124). The voice message is then played on the telephone line interface on which the offhook event was detected (see 126), and the telephony interface device 12 remains in the Registration Failed state 54.

If the user hangs up a phone connected to the telephony interface device 12 and the hardware detects this event, an onhook event is generated (see 128). If any voice message playout is in progress, the process is cancelled 132, and the telephony interface device 12 remains in the Registration Failed state 54. If the RegRetryTimer event 134 is received in this state, and the timer stops (136), the telephony interface device 12 transitions to the Registering state 53 in an attempt to re-register with the access network 14.

Figure 8:
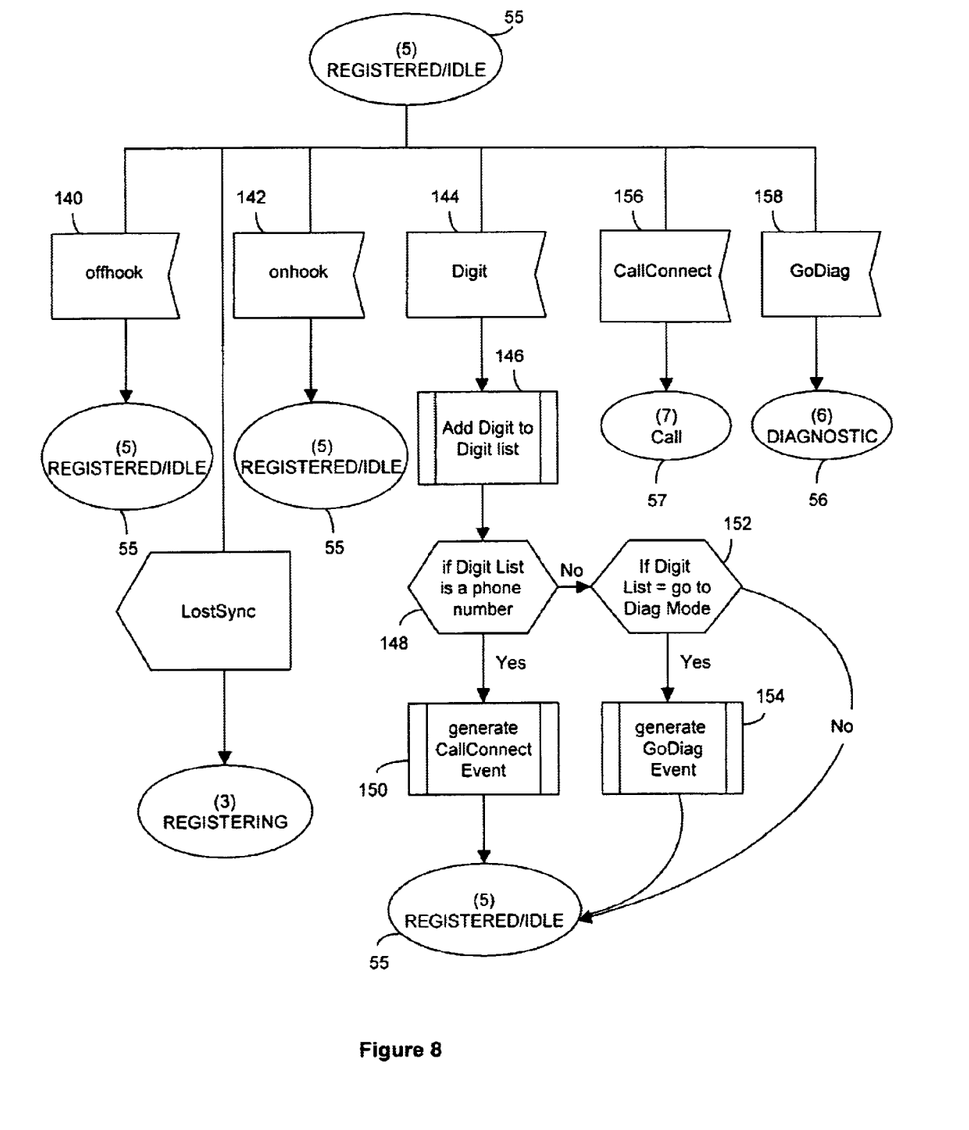
FIG. 8 is a flow chart illustrating the Registered Idle state shown in FIG. 3.

FIG. 8 is flow chart illustrating the operation of the telephony interface device 12 in the Registered Idle 55 state. In this state, the telephony interface device 12 has successfully communicated and synchronized (i.e., registered) with the network router/bridge 18 through the access network 14. If the user picks up a phone connected to the telephony interface device 12 and the hardware detects this event, an offhook event is generated (see 140). While in this state, the telephony interface device 12 will play a dial tone to the user and is waiting for digits on the phone to be inputted by the user, and remains in the Registered/Idle state 55.

If a user hangs up a phone connected to the telephony interface device 12 and the hardware detects this event, an onhook event is generated (see 142). While in this state, the telephony interface device 12 stops the dial tone and remains in the (5) Registered/Idle state. If the user enters a digit (144), the telephony interface device 12 will collect the digits until it has enough digits to proceed (146). If the user enters enough digits for a call (148), then the telephony interface device 12 generates a CallConnect event 150), and then remains in the Registered/Idle state 55. If the user entered the digits to enter diagnostics (152), then the telephony interface device 12 generates a GoDiag event (154) and then remains in the Registered/Idle state 55.

If the telephony interface device 12 receives a CallConnect event 156, it will transition to the Call state 57. If the telephony interface device 12 receives a GoDiag event 158, it will transition to the Diagnostic state 56.

Figure 9:
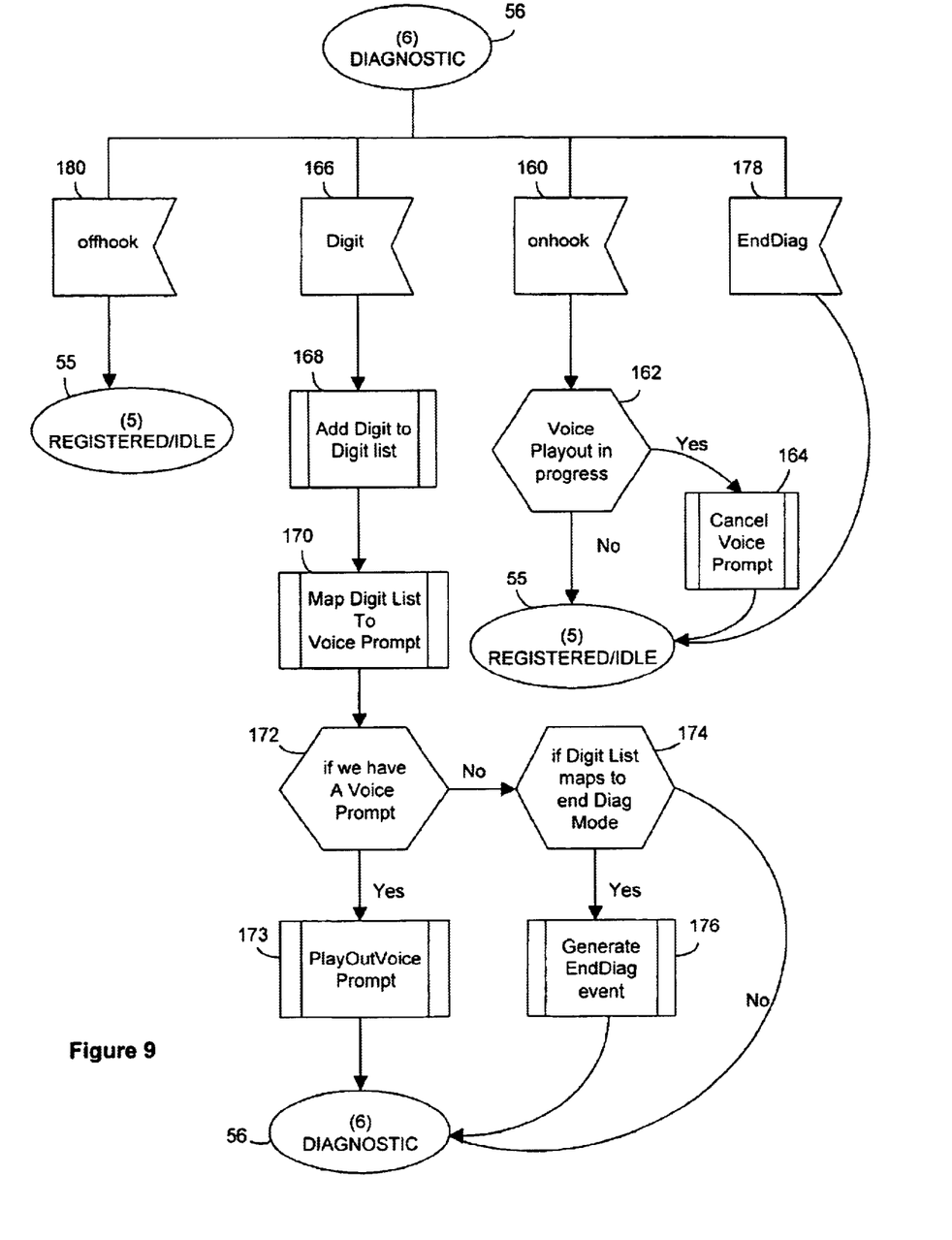
FIG. 9 is a flow chart illustrating the Diagnostic state shown in FIG. 3.

FIG. 9 is flow chart illustrating the operation of the telephony interface device 12 in the Diagnostic state 56. In this state, the telephony interface device 12 will process digits and play out voice prompts that give status about the telephony interface device 12. If the user picks up a phone connected to the telephony interface device 12 and the hardware detects this event, an offhook event 180 is generated, and the telephony interface device 12 remains in the Registered/Idle state 55. If the user hangs up a phone connected to the telephony interface device 12 and the hardware detects this event, an onhook event 160 is generated. If any voice message playout is in progress (see 162), the process is cancelled (see 164), and the telephony interface device 12 transitions to the Registered/Idle state 55.

If a user enters a digit 166, the telephony interface device 12 will collect the digits until it has enough digits to proceed (see 168). The telephony interface device 12 will process the digits and map to a voice prompt message and play it out to the user (see 170, 172). The telephony interface device 12 will remain in the Diagnostic state 56 after playing out the prompt (see 173).

If the user enter the digits to exit the diagnostic mode (see 174), then the telephony interface device 12 will generate a EndDiag event (see 176). When the telephony interface device 12 receives the EndDiag event (see 178), it will transition to the Registered Idle state 55.

Figure 10:
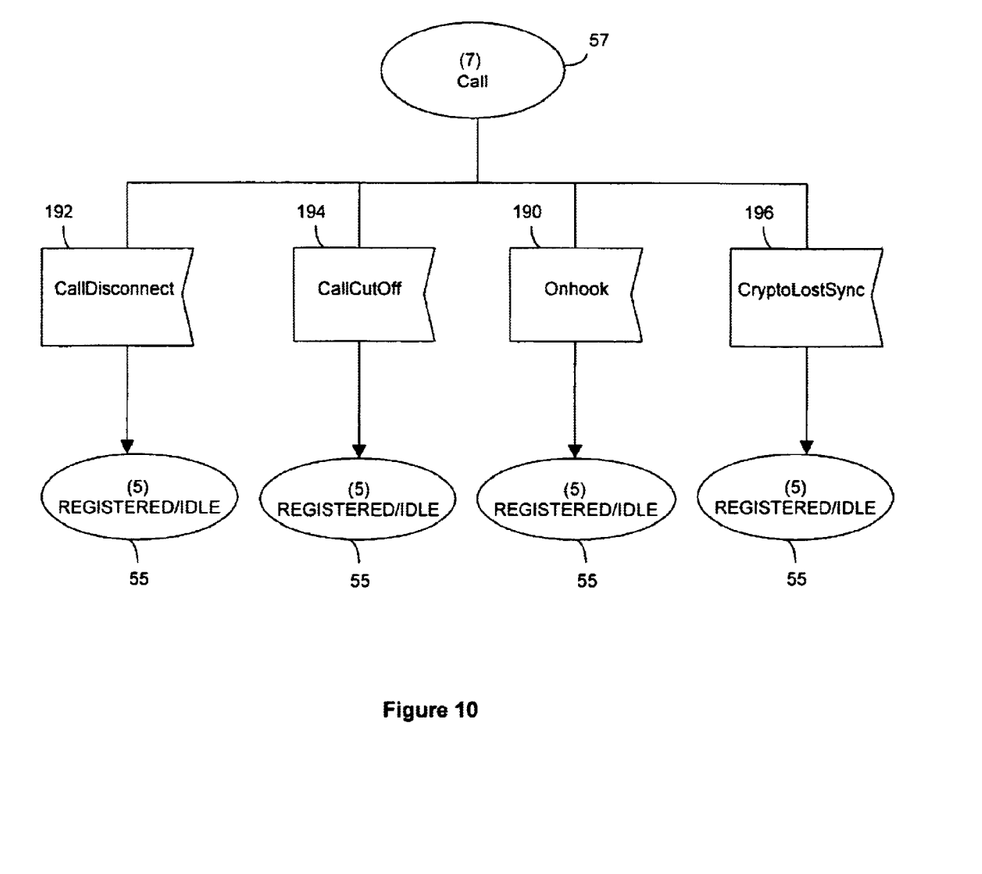
FIG. 10 is a flow chart illustrating the Call state shown in FIG. 3.

FIG. 10 is flow chart illustrating the operation of the telephony interface device 12 in the Call state 57. If a user hangs up a phone connected to the telephony interface device 12 and the hardware detects this event, an onhook event is generated (see 190), and the telephony interface device 12 remains in the Registered/Idle state 55. If the call is disconnected and the hardware detects this event, a CallDisconnect event is generated (see 192), and the telephony interface device 12 remains in the Registered/Idle state 55. Similarly, the telephony Interface device 12 remains in the Registered/Idle state 55 if the hardware of the telephony interface device 12 detects either a CallCutOff event 194 or a CryptoLostSync event 196.

As demonstrated above, the present invention utilizes interactive voice response techniques similar to those used in configuring various network-based telephone services. However, the present invention has the advantage of providing the telephony interface device 12, which is able to locally generate and control voice prompts to aid the user in understanding or diagnosing the system 10, telephony interface device 12, or line in use. Using a traditional telephone handset (see 20, 22) and associated DTMF keypad, the user or service technician can interact with a voice-based user interface on the telephony interface device 12 to select configuration options and/or retrieve status information about the system 10, device 12, or line in use. As a result, the present invention provides a simplified approach for providing system or network diagnostics that overcomes the problems associated with conventional status LEDs or terminal port interfaces that have been traditionally used by a user or technician to obtain diagnostic or status information.

The telephony interface device 12 stores various predetermined voice prompts (phrases, letters, numbers, etc. in multiple languages) as digitized speech samples. As described above, while a line-interface on the telephony interface device 12 is in the offhook state, the state of the system 10, device 12, or line may trigger control software in the telephony interface device 12 to play a voice prompt to the handset of the telephone to provide additional aural information to the user. Locally generated voice prompts can be mixed with network initiated tones for enhancing the user-experience in the configuration of various telephony or CLASS (what is this? please explain) features.

A voice prompted configuration mode may be invoked via a configurable passcode entered by the DTMF keypad of the phone 20, 22. While in this configuration mode, DTMF keypad entry can be used to accept user input selections that allows for further information retrieval on the system 10, device 12, or line, and also allows for configuration of attributes for the user's service, device, or line.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A system for providing diagnostic information to at least one telephone comprising:
    a telephony interface device including a memory device operatively coupled to the at the least one telephone through a telephone line, the telephony interface device operatively coupled to a public switched telephone network wherein the telephony interface device detects the diagnostic information, wherein the diagnostic information includes diagnostic information from the public switched telephone network, diagnostic information from the telephony interface device, and diagnostic information from the telephone line, and wherein the diagnostic information is stored in the memory device.

2. The system of claim 1 wherein the diagnostic information is transmitted to the at least one telephone through voice prompts.

3. The system of claim 1 wherein the diagnostic information is requested through the at least one telephone by a user of the at least one telephone.

4. The system of claim 3 wherein the at least one telephone includes a Dual Tone Multi-Frequency keypad, and wherein the diagnostic information is requested through the Dual Tone Multi-Frequency keypad.

5. The system of claim 1 wherein the transmission of diagnostic information includes an interactive exchange between the telephony interface device and a user of the at least one telephone.

6. The system of claim 5 wherein the interactive exchange is carried out at least in part through voice prompts.

7. The system of claim 5 wherein the at least one telephone includes a Dual Tone Multi-Frequency keypad, and wherein the interactive exchange is carried out at least in part through the Dual Tone Multi-Frequency keypad.

8. The system of claim 1 wherein the public switched telephone network comprises a service provider network.

9. The system of claim 8 further comprising an access network, the access network operatively coupled between the service provider network and the telephony interface device.

10. The system of claim 9 further comprising a network router, the network router operatively coupled between the access network and the service provider network.

11. The system of claim 1 wherein the telephony interface device includes an access network interface operatively coupled to the public switched telephone network to allow the telephony interface device to be in communication with the public switched telephone network.

12. The system of claim 1 wherein the telephony interface device includes a host processor for controlling and routing data between the access network interface and the at least one telephone, the telephony interface device further including a memory device, the host processor and the memory device each operatively coupled to the access network interface.

13. The system of claim 12 wherein the telephony interface further includes a signal processor for transmitting diagnostic information to the at least one telephone, the signal processor operatively coupled to the access network interface, the host processor, and the memory device.

14. The system of claim 13 wherein the signal processor is a digital signal processor.

15. The system of claim 13 wherein the telephony interface device further includes a telephone interface operatively coupled to the signal processor and to the at least one telephone to allow the telephony interface device to be in communication with the at least one telephone.

16. The system of claim 1 wherein the diagnostic information is transmitted from the telephony interface device to the at least one telephone prior to establishing a connection between the at least one telephone and the public switched telephone network.

17. A telephony interface device for providing diagnostic information to at least one telephone operatively coupled to the telephony interface device comprising:
    an access network interface to allow the telephony interface device to be in communication with a public switched telephone network, the access network interface operatively coupled to a host processor for controlling and routing data between the access network interface and the at least one telephone, the access network interface also coupled to a memory device, a signal processor operatively coupled to the access network interface, the host processor and the memory device, the signal processor operatively coupled to a telephone interface wherein the telephony interface device detects the diagnostic information, wherein the diagnostic information includes diagnostic information from the public switched telephone network, diagnostic information from the telephony interface device, and diagnostic information from the telephone line, and wherein the diagnostic information is stored in the memory device.

18. A method of providing diagnostic information to at least one telephone comprising:
    providing a telephony interface device having a memory device operatively coupled to the at least one telephone through a telephone line, the telephony interface device operatively coupled to a public switched telephone network;
    detecting the diagnostic information with the telephony interface device wherein the diagnostic information includes diagnostic information from the public switched telephone network, diagnostic information from the telephony interface device, and diagnostic information from the telephone line;
    storing the diagnostic information in the memory device; and
    transmitting diagnostic information from the telephony interface device to the at least one telephone.

19. The method of claim 18 wherein the diagnostic information is transmitted to the at least one telephone through voice prompts.

20. The method of claim 18 wherein the diagnostic information is requested through the at least one telephone by a user of the at least one telephone.

21. The method of claim 20 wherein the at least one telephone includes a Dual Tone Multi-Frequency keypad, and wherein the diagnostic information is requested through the Dual Tone Multi-Frequency keypad.

22. The method of claim 18 wherein the transmission of diagnostic information includes an interactive exchange between the telephony interface device and a user of the at least one telephone.

23. The method of claim 22 wherein the interactive exchange is carried out at least in part through voice prompts.

24. The method of claim 22 wherein the at least one telephone includes a Dual Tone Multi-Frequency keypad, and wherein the interactive exchange is carried out at least in part through the Dual Tone Multi-Frequency keypad.

25. The method of claim 18 wherein the public switched telephone network comprises a service provider network.

26. The method of claim 25 further comprising:
providing an access network, the access network operatively coupled between the service provider network and the telephony interface device.

27. The method of claim 26 further comprising a network router, the network router operatively coupled between the access network and the service provider network.

28. The method of claim 18 wherein the telephony interface device includes an access network interface operatively coupled to the network to allow the telephony interface device to be in communication with the public switched telephone network.

29. The method of claim 18 wherein the telephony interface device includes a host processor for controlling and routing data between the access network interface and the at least one telephone, the telephony interface device further including a memory device, the host processor and the memory device each operatively coupled to the access network interface.

30. The method of claim 29 wherein the telephony interface further includes a signal processor for transmitting diagnostic information to the at least one telephone, the signal processor operatively coupled to the access network interface, the host processor, and the memory device.

31. The method of claim 30 wherein the telephony interface device further includes a telephone interface operatively coupled to the signal processor and to the at least one telephone to allow the telephony interface to be in communication with the at least one telephone.

* * * * *